July 19, 1960 L. C. FOSTER 2,945,982

ELECTRONIC DEVICE

Filed Sept. 21, 1955 5 Sheets-Sheet 1

INVENTOR.
LEIGH CURTIS FOSTER
BY James E. Toomey
atty.

July 19, 1960 L. C. FOSTER 2,945,982

ELECTRONIC DEVICE

Filed Sept. 21, 1955 5 Sheets-Sheet 2

INVENTOR.
LEIGH CURTIS FOSTER
BY James E. Toomey
Atty.

July 19, 1960 L. C. FOSTER 2,945,982

ELECTRONIC DEVICE

Filed Sept. 21, 1955 5 Sheets-Sheet 3

INVENTOR.
LEIGH CURTIS FOSTER
BY James E. Toomey
Atty.

July 19, 1960 L. C. FOSTER 2,945,982

ELECTRONIC DEVICE

Filed Sept. 21, 1955 5 Sheets-Sheet 4

INVENTOR.
LEIGH CURTIS FOSTER
BY James E. Toomey
Atty.

July 19, 1960 L. C. FOSTER 2,945,982

ELECTRONIC DEVICE

Filed Sept. 21, 1955 5 Sheets-Sheet 5

INVENTOR.
LEIGH CURTIS FOSTER
BY James E. Toomey
Atty.

United States Patent Office 2,945,982

Patented July 19, 1960

2,945,982

ELECTRONIC DEVICE

Leigh C. Foster, Westmount, Quebec, Canada, assignor, by mesne assignments, to Kaiser Industries Corporation, a corporation of Nevada Filed Sept. 21, 1955, Ser. No. 535,577

10 Claims. (Cl. 315—21)

Figure 1:
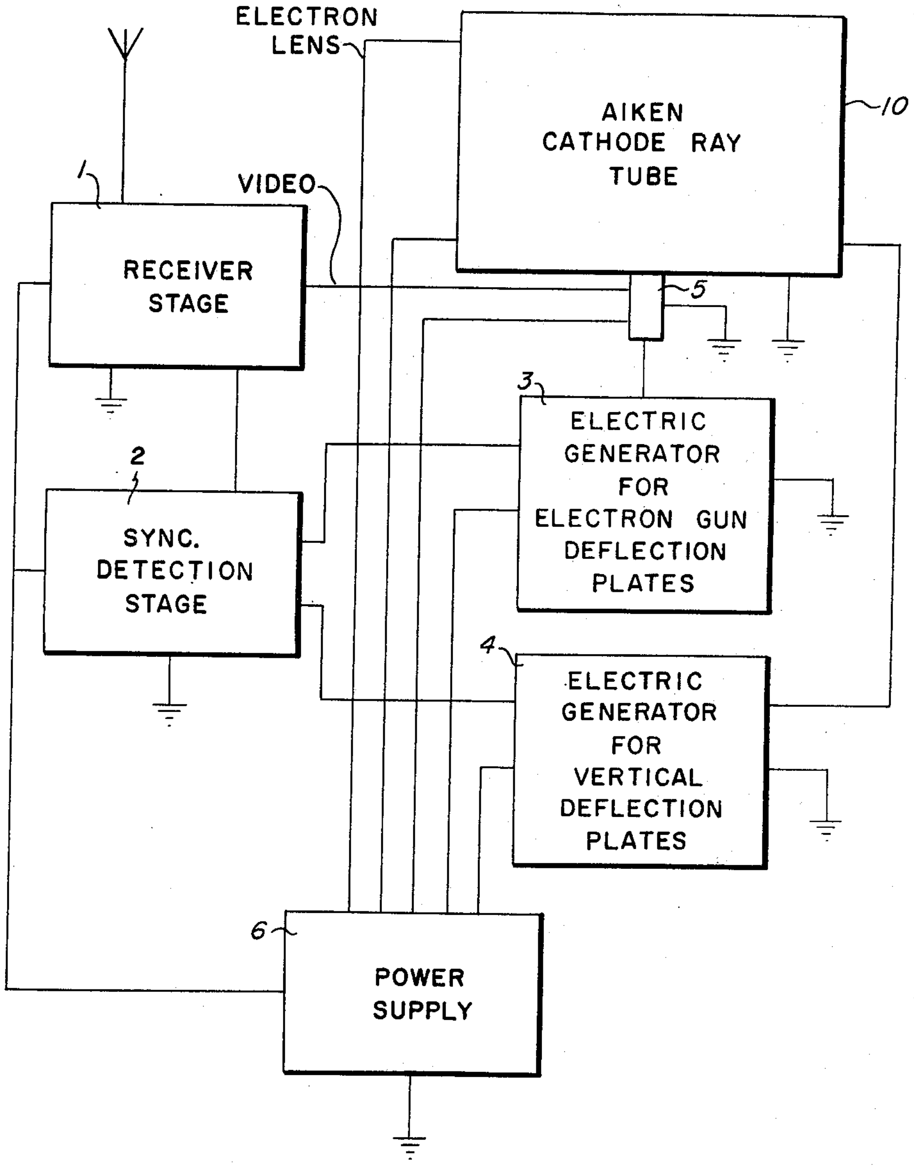

The present invention is directed to a new and novel cathode ray tube, and particularly to a novel cathode ray tube including a novel electrostatic deflection arrangement.

The tube of the present invention is a novel variation of the revolutionary tube type known in the art as an "Aiken-type tube" which has been disclosed in the copending applications having Serial No. 355,965 which was filed May 19, 1953, now abandoned, and Serial No. 396,120 which was filed December 4, 1953, and issued June 11, 1957, as Patent 2,795,731.

The Aiken-type tube, in its basic concepts, is comprised of a configuration which approximates that of a picture adapted for wall mounting. In a small size the tube is comparable in size and shape to a metropolitan telephone directory.

The numerous advantages and applications of the so-called Aiken-type tube are well known to persons skilled in the art. Prominent among the features and advantages attendant a tube of this general type are its overall compactness which permits the use thereof in smaller volumes than tubes of conventional design; possibility of extremely high definition and resolution which results from the sharp electrostatic focus arrangement; the reduction in expensive components resulting from the use of low power consuming electrostatic deflection elements; and the use of light weight inexpensive components replacing the high voltage deflection yokes, vertical and horizontal output transformers, magnetic deflection coils, and others of the bulky and expensive components now incidental to the vertical and horizontal stages for use with cathode ray tubes previously known in the art. The novel tube also is featured by the reduction in weight of its physical mass, its flexibility and adaptation to mounting into various positions and in association with other equipment, and its adaptability for use with other types of electronic and optical units. These, and other features and advantages have been set forth only briefly herein, and numerous other features and advantages will doubtless be apparent to persons skilled in the art.

It is likewise apparent that the novel configuration and physical characteristics of the tube lend such a unit for use in applications too numerous to set forth herein. There is, by way of example in Figure 2, a version of the tube as adapted for wall mounting in the presentation of commercial television programs, general instrumentation usage in laboratories, and other applications too numerous to mention.

As there shown, the tube is encased in a simple housing which is adapted to be hung on the wall. Control dials may be mounted conveniently at any portion of the periphery or alternately may be extended by cable means to a remote control position in a manner well known in the art. The tube may be transparent in nature whereby the unit may be readily mounted in the direct line of vision of the operator of an aircraft or the like. In such event, the switching equipment would be available to the operator for affecting presentation of a picture on the screen only at such times the operator desires.

Figure 2:
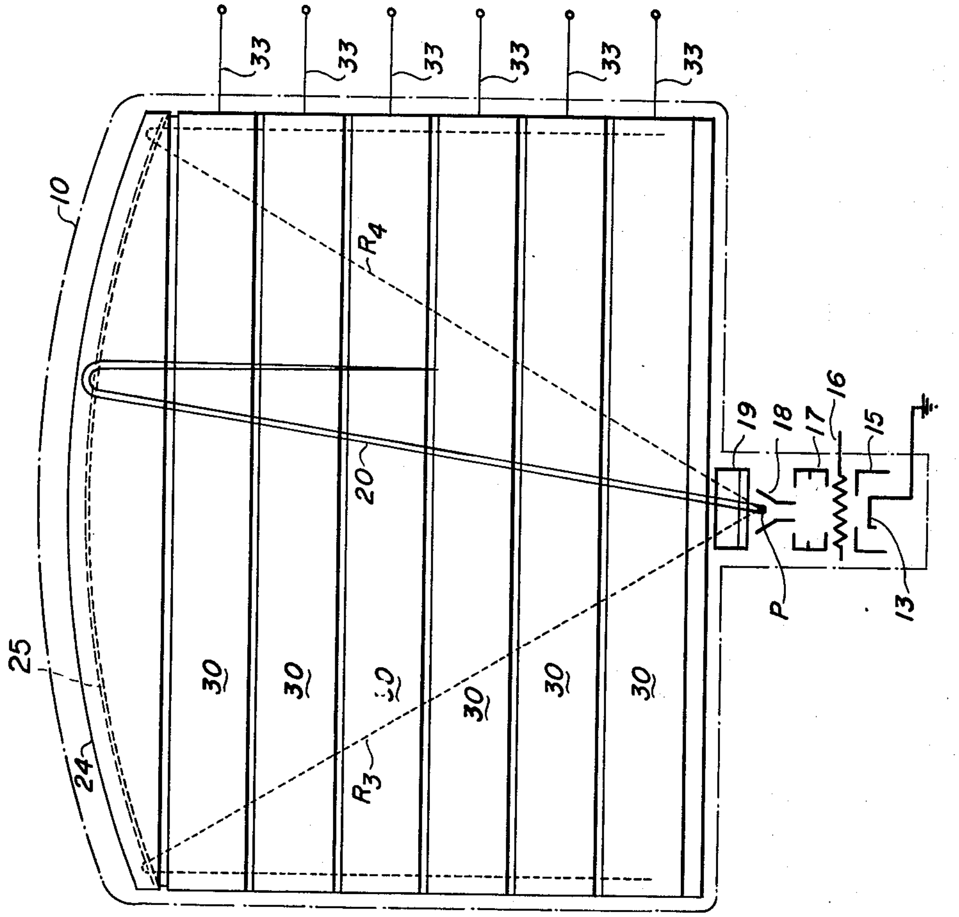
Figure 3:
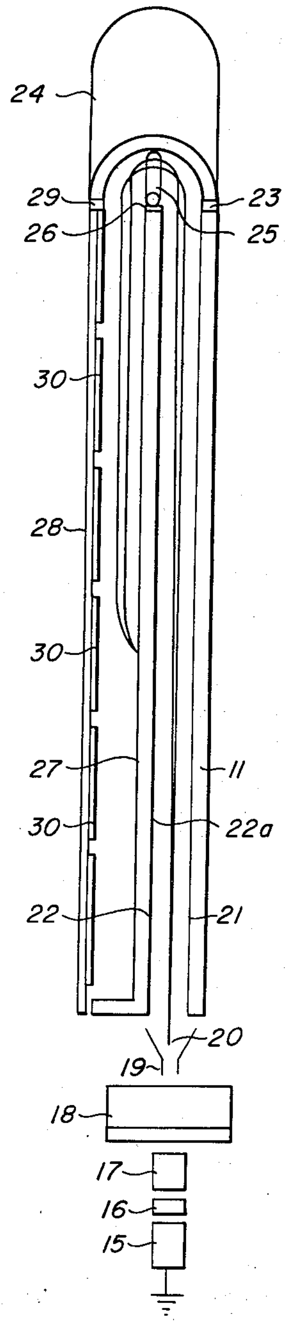
Figure 4:
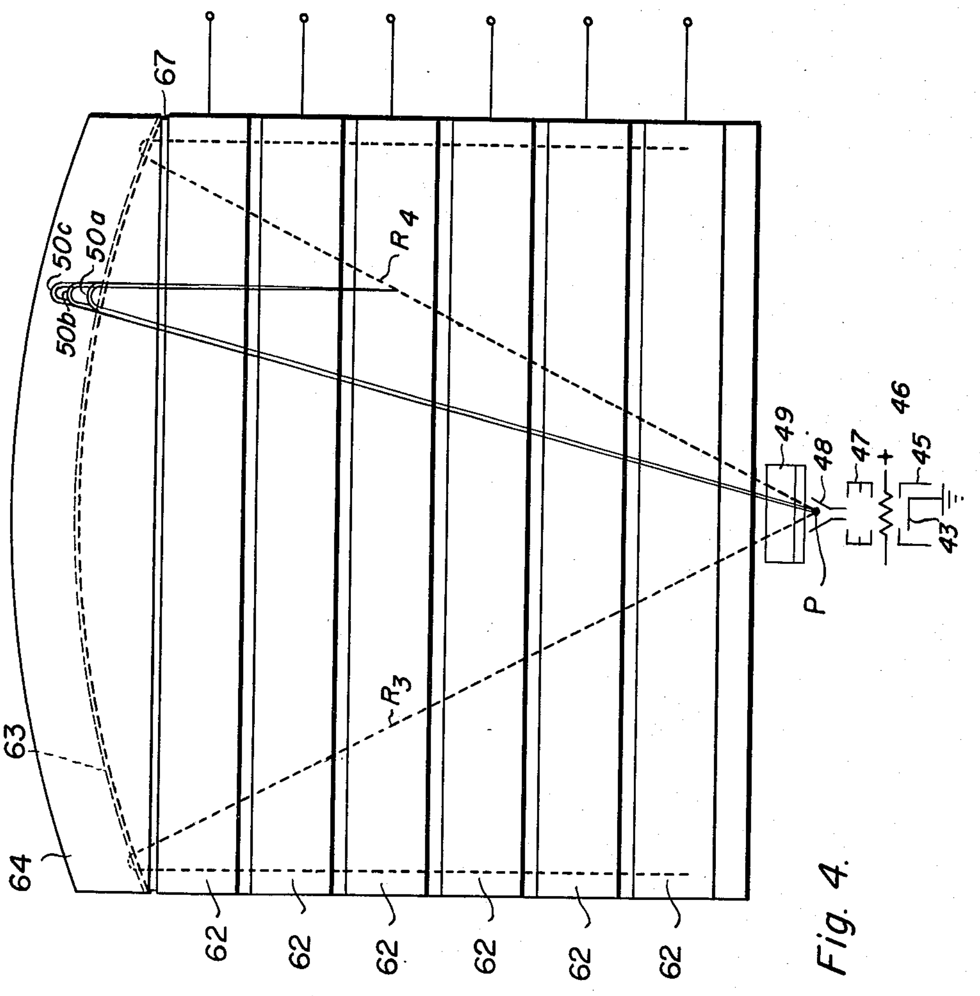
Figure 5:
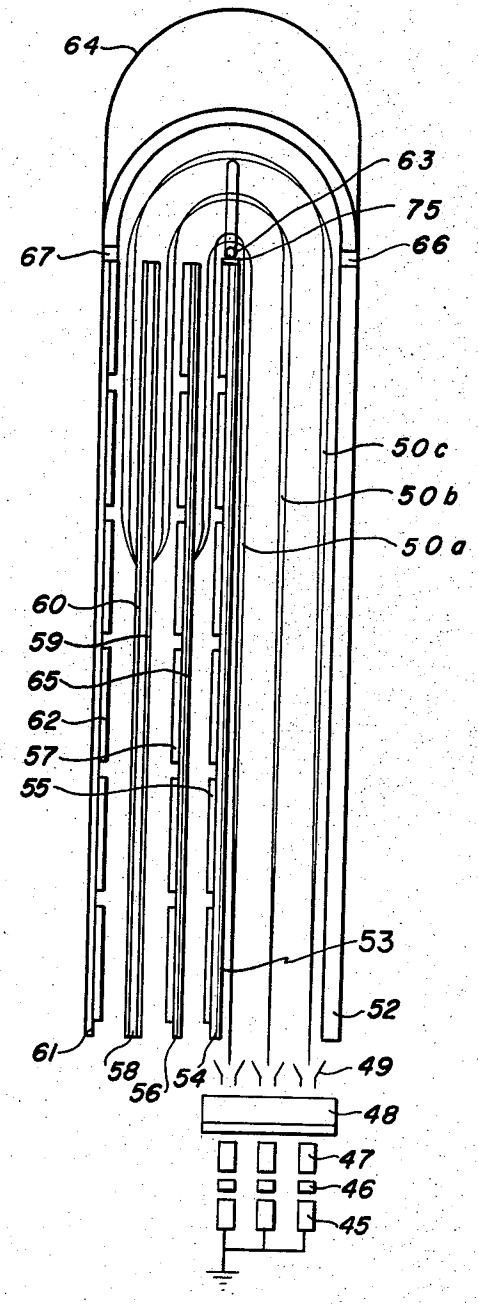

The basic unit may either comprise a tube capable of presenting the conventional black and white image presentation on the screen thereof as shown specifically with reference to Figures 2 and 3; or may be of a type capable of exhibiting images in full color as shown in Figures 4 and 5.

A more complete understanding of the instant invention may be had by a brief discussion of the invention disclosed and claimed in the copending application of H. R. Aiken Serial No. 396,120 now Patent No. 2,795,731, which relates to a cathode ray tube wherein the electron gun is disposed in such a manner relative to the target area of the tube that its scanning beam passes parallel and closely adjacent to the luminescent face of said target area, and means are provided to deflect the beam selectively to consecutively different levels toward the target area so that the beam will strike consecutively different levels of the luminescent coating thereof and recreate the visual television image thereon. As a result of the above described arrangement, it is possible to make an electronic television picture tube in the shape of a shallow envelope. In certain embodiments it is desirable to minimize "keystoning" effects in the final display presented on the luminescent face of the target due to the fact that the electron gun is disposed in extremely close relation with respect to the substantially rectangular target so that the area scanned by the electron beam which originates and oscillates from a point source would be in the form of a keystone. By means of the instant invention, a novel cathode ray tube is produced which provides a substantially rectilinear display on the target area thereof.

The invention depicts a novel variation of the Aiken-tube of the rectangular cathode ray tube type wherein the structure is composed of three parts, which may be termed the primary, intermediate, and secondary sections. The primary section consists of two flat parallel conducting plates, which may be of the same size and shape as the picture raster required. These two plates are operated or maintained at equal potentials, thereby defining a field-free region therebetween. An electron gun is disposed so as to deliver a beam of electrons along a path between the aforementioned plates. A pair of coaxial conducting semi-cylinders comprising the intermediate section is disposed in insulatingly spaced relation with respect to the edges of the plates opposite the edge in close proximity with respect to the electron gun. The intermediate section is so disposed that the tangent to the inner cylinder is in the same plane as the inner surface of one of the plates of the primary section but displaced therefrom so that different potentials may be applied to the two parts. The inner surface of the larger cylinder is disposed so as to be in the same plane as the inner surface of the other plate of the primary section but insulatingly spaced so that different voltages may be applied to each part.

The secondary section comprises two parallel plates disposed in a more or less superposed position with respect to the plates comprising the primary section. One of these plates consists of glass, coated with conducting strips arranged across the face thereof in a parallel relation with respect to one another. The other conducting plate is coated with a fluorescent material which when bombarded by electrons of sufficient energy will emit visible light.

In operation, the electron beam caused to be delivered by the electron gun travels a path intermediate the plates comprising the primary section in the field-free region established thereby. As the electron beam leaves the electron gun, it is deflected by the horizontal deflection plates of the gun and hence may be caused to sweep a fan-shaped sector within the primary field-free region. The beam is then caused to enter the intermediate section and is caused to be deflected thereby through substantially 180° and directed along a plane intermediate the plates of the secondary section. Upon suitable energization of the conducting strips on the inner surface of one or more of the plates of the secondary section, the beam will be caused to be deflected toward and impinge on the fluorescent coating of the other plate of the secondary section. The resulting image appearing on the fluorescent coating may be suitably viewed on the target plate through the glass plate of the secondary section.

All of the above will be much more readily understandable by reference to the following detailed description of the several embodiments of the invention, when considered in connection with the accompanying drawings wherein Figure 1 is a schematic drawing of a system capable of employing the device of the instant invention, Figure 2 is a front view of the device, Figure 3 is a side view of the device shown in Figure 2, Figure 4 is a front view of an embodiment of the instant invention capable of color display, and Figure 5 is a side view of the device shown in Figure 4.

Figure 1 shows, in block diagram, a system for satisfactorily operating the present invention. The transmitted signal from the television transmitter is received by an antenna which feeds both the video and audio signals into the television receiver. For purposes of simplification only, the video portion of the electronic circuitry will be discussed and described hereinafter. The video signal is fed to the receiver stage 1 which may include the R-F amplifier, the I-F amplifier, and the video amplifier. The receiver stage 1 is adapted to pass a video signal to the electron gun 5 of the cathrode ray tube of the instant invention. Also, the receiver stage 1 is adapted to pass a signal to the sync detection stage 2 which is adapted to separate the signals for energizing the electric generator 3 for the deflection plates of the electron gun 5 and also the electric generator 4 for the vertical deflection elements of the tube comprising the instant invention. The sync detection stage 2 provides the necessary synchronization between the transmitting and receiving scanning operations.

The receiver stage 1, the sync detection stage 2, the electric generator 3 for the deflection plates of the electron gun, the electric generator 4 for the vertical deflection plates, the electron gun 5, the target, and the electron mirror or lens arrangement of the cathode ray tube of this invention, obtain their electrical energy from a power supply 6. It must be understood that single lines on the drawing of Figure 1 may include a single or a plurality of conductors.

Figures 2 and 3 show an embodiment of the invention for black and white display employing an evacuated envelope 10 having therewithin an electron gun including cathode 13, a control electrode 15, and accelerating electrodes 16 and 17, adapted to deliver an electron beam 20. An electrostatic deflection means is provided for achieving a horizontal scan of the electron beam and comprises a pair of horizontal and vertical electrostatic deflection plates 18 and 19, respectively. Any suitable electron beam forming arrangement may be employed in the practice of this invention, and a detailed description thereof is not given here, but may be found in literature such as for example, in an article entitled, "Improved Electron Gun for Cathode Ray Tubes" by L. E. Swedlund in "Electronics" for March 1946. It will be obvious to those skilled in the art that electromagnetic deflection means may likewise be employed.

Disposed in spaced relation with respect to the vertical deflection plates 19 of the electron gun, there is disposed a pair of plates 21 and 22. The plates 21 and 22 are spaced from one another a degree sufficient to allow for electron beam passage therebetween. It has been found satisfactory to space the plates a distance of one-half inch. The plate 22 is formed of a dielectric material, such as for example, glass. One surface of the plate 22 is coated with an electrically conducting material 22a which together with the plate 21 comprise the so-called primary section. The plate 21 and the conductive coating 22a are maintained at the desired potential from a power supply situated outside the tube envelope through suitable electrical conductors, not shown.

A fluorescent coating 27 is disposed on the plate 22 on a surface opposite the conducting coating 22a and is maintained at the desired positive potential with respect to the cathode potential of the electron gun through suitable electrical conductors from a power supply outside the tube wall. An optically transparent plate 28 is disposed in spaced relation with respect to the plate 22 a degree sufficient to permit beam travel therebetween. The inner surface of the transparent plate 28 is provided with a plurality of coextensive, transparent electrically conducting electrodes 30, spaced apart. These electrodes may be formed of an electrically conducting glass or the like. The electrodes 30 are suitably energized from an electric generator situated outside the tube wall through electrical conductors 33 which are shown in Figure 2. The electrodes 30 and the fluorescent coating 27 together comprise the so-called secondary section.

A coaxial electron lens arrangement comprising the intermediate section is disposed along the upper marginal edge of the aforementioned plates. The electron lens arrangement comprises an outer cylindrical coaxial electrode 24 and an inner coaxial electrode 25. The outer electrode 24 is maintained in insulatingly spaced relation from the plates 21 and 28 by insulating strips 23 and 29, respectively, which are coextensive with the top marginal edges of the plates. The inner coaxial electrode 25 is maintained in insulatingly spaced relation with respect to the fluorescent coating 27 and the conductive coating by an insulating member 26 which makes possible the application of separate potentials to the fluorescent coating 27, the conductive coating 22a, and also the electrode 25. The electrodes 24 and 25 of the electron lens arrangement are energized from a source of potential which is situated outside the tube wall through suitable electrical conductors.

The coaxial cylinders 24 and 25 are preferably formed in a parabolic shape and function similarly to a parabolic mirror which reflects visible light rays and are so formed with the effective focal point of the parabola intermediate the horizontal deflection plates 18 of the electron gun, thus exhibiting on the display section of the assembly a raster which is rectangular in shape. The electron lens arrangement should be shaped to correct for distortion and also to cause the rays from the fan-shaped configuration in the primary section, which is defined by the plates 21 and 22, to emerge parallel to one another in the secondary section defined by the plates 22 and 28 and hence produce a rectangular raster on the fluorescent coating 27 of plate 22.

The electron mirror or lens arrangement of the instant invention functions on a theory similar to a mirror used to reflect light rays. In the field of optics, a parabolic mirror functions to cause light rays which emanate radially from a point source located at the focal point of the mirror to be reflected in a manner whereby all the reflected rays assume paths of travel which are substantially parallel to one another. In this invention, the electrodes constituting the mirror or lens arrangement are formed substantially in the shape of a parabola wherein the longitudinal axis of the parabola lies in a plane which is substantially parallel to the plane of the target. The arrangement is disposed so that the effective focal point of the parabola resides at the point P, intermediate the horizontal deflection plates of the electron gun, as diagrammatically shown in Figures 2 and 4. Accordingly, if we assume for purposes of illustration and analogy with the principles of optics that the electron beam actually emanates from the focal point P of the parabolic curve of the electron mirror arrangement, it will be readily discerned that after the electron beam is caused to be reflected or deflected by the electron mirror the paths of travel assumed thereby are substantially parallel to one another.

In operation, the gun assembly is adapted to deliver a beam of electrons 20 between the plate 21 and conductive coating 22a through a field-free region established therebetween. The field-free region is established by applying equal potentials to the plate 21 and the conductive coating 22a simultaneously, thereby establishing a region which is free of any spurious electrostatic fields which if present would interfere with the electron beam travel therethrough. When the electron beam 20 reaches the uppermost region defined by the plate 21 and coating 22a, it is caused to be deflected from its path therein to another path on the opposite side of the assemblage, which second path lies within the region defined by the optically transparent plate 28 and the fluorescent coating 27. The electron beam bend is caused by the electron lens arrangement which comprises the coaxial electrodes 24 and 25. The electrode 25 is maintained at a potential which is positive with respect to the cathode potential of the electron gun and the electrode 24 is maintained at a potential which may be negative with respect to the potential of the electrode 25. Thus, the electrostatic fields established by the electron lens arrangement cause the electron beam 20 to be bent through substantially 180° and directed into the secondary region defined by the optically transparent plate 28 and the fluorescent coating 27.

Initially, the transparent deflection electrodes 30 are maintained at a potential which is equal to the potential applied to the fluorescent coating 27 establishing thereby a field-free region therebetween. Electron beam 20 after being directed within this field-free region may travel downwardly in adjacent spaced relation with respect to the vertical deflection electrodes 30 until a suitable negative potential with respect to the potential of fluorescent coating 27 is applied to the transparent deflection electrodes 30. Upon the application of a suitable negative potential on one or more of the transparent electrodes 30, the electron beam 20 will be deflected thereby and caused to impinge upon the fluorescent coating 27 which is coated on the plate 22. Such electron bombardment upon the fluorescent material causes the material to become excited and give off a visible luminescent signal.

Both the electric generators for the horizontal deflection plates 18 of the electron gun and the electric generator for the vertical transparent deflection plates 30 are controlled by signals which they receive from the sync detection stage which stage functions to separate the respective signals received from the television transmitter. By proper energization of the horizontal deflection plates 18 of the electron gun and the vertical transparent deflection plates 30, the electron beam 20 may be caused to scan the fluorescent coating 27 of the plate 22 in synchronism with the electron beam of the television camera at the transmitter thereby presenting a pictorial replica of the transmitted scene.

If both the outer coaxial cylinder 24 and the inner electrode 25 of the electron lens arrangement are operated at potentials which are different from the potential which is applied to the plates 21 and 22a, the region defined by the coaxial electron lens arrangement and the plates 21 and 22 forms a convergent lens for the electron beam 20. As the electron beam 20 travels through the regions defined by the coaxial electron lens arrangement it is accelerated normally and follows a path of nearly constant radius between the coaxial cylinders 24 and 25. For a relatively large beam, the electron lens of the instant invention produces two cross-over, or focal points, spaced geometrically 127° apart or more exactly $(180/\sqrt{2})°$ as diagrammatically shown in Figure 3. The potentials applied to the electrodes 24 and 25 which form the electron lens, in operation may be adjusted so that these cross-over points occur such that the resulting beam in the secondary region will be in focus.

It further must be pointed out that if the voltages applied to the transparent vertical deflection electrodes 30 and the fluorescent coating 27 are different from the potentials which are applied to the electrodes 24 and 25, the region therebetween also forms a convergent lens for the electron beam. The voltages hereinabove mentioned are adjusted so that the beam emerges from the intermediate section which comprises the electron lens, arrangement with parallel rays as is diagrammatically illustrated in Figures 2 and 3. It must be understood that in order to achieve a line scan across the fluorescent coating 27, potentials must be impressed on the horizontal deflection plates 18 and the transparent deflection electrodes 30 in synchronism. The potentials impressed on the horizontal deflection plates 18 of the electron gun causes the beam sweep between the limits as indicated by the dotted lines $R_1$ and $R_2$ such that the electron beam 20 will sweep at a frequency which is the same as the horizontal sweep frequency of the electron beam of the transmitting camera.

Another embodiment of the invention is illustrated in Figures 4 and 5. In this embodiment, the cathode ray tube is capable of exhibiting color images or displays. The image reproducing tube may have three (3) associated electron beam guns including cathodes 43, control electrodes 45, and accelerating electrodes 46 and 47. Any suitable electron beam forming arrangement may be employed in the practice of this invention, and a detailed description thereof is not given here, but may be found in literature such as, for example, in an article entitled, "Improved Electron Gun for Cathode Ray Tubes," by L. E. Swedlund in "Electronics" for March 1946. For example, three separate electron guns could be employed with common or respective sets of horizontal and vertical deflection plates to produce three parallel beams. Similarly, a single electron gun with one cathode and three grids and three pairs of deflection plates could be employed.

Horizontal and vertical electron beam deflection plates 48 and 49, respectively, are shown to provide for electrostatic deflection of the electron beams 50a, 50b, 50c. It will be obvious to those persons skilled in the art that electromagnetic deflection means may likewise be employed in the practice of this invention. The deflection plates 48 and 49 are energized by an electric generator situated outside of the tube wall through suitable electrical conductors. The necessary synchronization between the transmitting and receiving scanning operations is obtained from the receiver through the sync detection stage shown in Figure 1.

The device comprising the instant invention employs an evacuated envelope, not shown, having therewithin a plurality of plates of substantially the same size. The plates are in superposed relation being separated a degree sufficient to permit electron beam passage therebetween.

A pair of plates 52 and 54 is provided within the envelope arranged relative to the electron beam sources so as to permit the electron beams 50a, 50b, and 50c to travel therebetween. The plate 54 is formed of a dielectric material, such as for example, glass. One surface of the plate 54 is provided with an electrically conductive coating 53 which, together with the plate 52, comprise the so-called primary section. The conductive coating 53 and the plate 52 obtain their energization from a power supply situated outside the tube through suitable electrical conductors. The plate 52 forms the rear-most plate of the cathode ray tube and is formed of electrically conductive material which may be opaque or optically transparent in which latter case the display presented by the device could be viewed from either or both of the two sides.

The plate 54 is adapted to carry a plurality of vertical deflection elements 55 on the opposite surface thereof from the conductive coating 53. The deflection elements 55 are selectively energized from an electric generator outside the tube wall through suitable electrical conductors.

In spaced superposed relation with respect to the plate 54, there is provided an optically transparent plate 56. One surface of the plate 56 facing the deflection electrodes 55 is coated with a fluorescent material 65 which is capable of emitting light of one of the primary colors, such as for example, green, upon impingement thereon by a beam of electrons and may be aluminized to increase light intensity and establish the voltage of the phosphor relative to the incident beam. This coating is maintained at the desired positive potential with respect to the cathode potential of the electron gun from a power supply outside the tube envelope through a suitable electrical conductor. The other surface of the plate 56 is provided with a plurality of optically transparent electrically conducting vertical deflection elements 57. The deflection elements 57 are selectively energized from an electric generator situated outside of the tube wall through suitable electrical conductors.

An optically transparent plate 58 is disposed in spaced relation with respect to the plate 56. Both surfaces of the plate 58 are coated with fluorescent coatings 59 and 60 capable of emitting light upon electron bombardment thereon. The coating 59 is capable of emitting light of one color, as for example, blue, and the other coating 60 is capable of emitting light of still another color, such as for example, red. The fluorescent coatings 59 and 60 are maintained at the desired positive potential with respect to the cathode potential of the electron gun from a power supply situated outside of the tube wall through suitable electrical conductors. It is well to use conducting surfaces on the glass to establish the proper potential for the incident beam.

In superposed spaced relation with respect to the plate 58, there is disposed an optically transparent plate 61 which is adapted to carry a plurality of optically transparent electrically conducting vertical deflection elements 62. The deflection elements 62 obtain their electrical energy from an electric generator outside the tube wall through suitable electrical conductors.

It must be pointed out that the plates which are adapted to carry the vertical deflection electrodes and the fluorescent coatings comprise a multiple arrangement of the so-called secondary section of the instant device.

In order to effect deflection of the electron beams 50*a*, 50*b* and 50*c* from the primary section or zone defined by the plate 52 and conductive coating 53 into the secondary section, an electron mirror comprising the intermediate section, is provided along the marginal edges of the plates opposite the electron beams source means. The electron mirror arrangement comprises a pair of coaxial electrodes 63 and 64 and functions in the same manner as electron mirror shown in Figures 2 and 3. The inner electrode 63 of the electron mirror is disposed at the upper marginal edge of the conductive coating 53 and insulatingly spaced therefrom by an electrical insulator 75. The outer coaxial electrode 64 is disposed in spaced coaxial relation with respect to the inner member 63 and has its free edge portions insulatingly affixed to the upper edges of the plates 52 and 61. In order to electrically insulate the electrode 64, insulating members 66 and 67 are provided along the free edges of the electrode 64. The desired potentials are impressed on the electrodes 63 and 64 from a power supply situated outside of the tube wall through suitable electrical conductors.

The effective focal point of the parabolic curve of the electrodes 63 and 64 resides at point P intermediate the horizontal deflection plates 48 of the electron gun as diagrammatically shown in Figure 4.

In operation, the electron beam guns deliver electron beams 50*a*, 50*b*, and 50*c* between the plates 52 and the conductive coating 53. The beams 50*a*, 50*b*, and 50*c* under the influence of the common or independent horizontal deflection plates 48 may sweep through the zone between the plate 52 and the conductive coating 53. The plate 52 and conductive coating 53 are maintained at equal potentials thereby establishing a field-free region therebetween which has no deleterious effect on the beam travel. The limits of the area scanned by the electron beams 50*a*, 50*b*, and 50*c* in the field-free region are represented by the dotted lines $R_3$ and $R_4$ shown in Figure 4.

In the reproduction of transmitted color television signals, the television receiver must be capable of separating these signals and passing them to the appropriate electrodes of the instant device. For purposes of the description, the first image to be reproduced by the receiver is the green image. In such case, the electron beam 50*a* is caused to be deflected or bent from its first path of travel between the plate 52 and the conductive coating 53 to a second path between the plates 54 and 56. In order to effect the desired bending, suitable potentials must be applied to the electron mirror arrangement. The potential applied to the electrode 63 must be positive with respect to the cathode potential of the electron gun so as to attract the beam 50*a*. Simultaneously, the potential applied to the electrode 64 may be negative with respect to the potential of electrode 63 so as to repel the beam 50*a*. By a proper adjustment of these potential values, the beam 50*a* is caused to be sharply bent so as to travel along a path between the plates 54 and 56 substantially parallel to its initial path and in a direction opposite thereto. Initially, the potential values of the vertical deflection elements 55 and the plate 56 are equal thereby establishing a field-free zone which permits the electron beam 50*a* to travel unaffected therethrough. Upon proper energization of one of the vertical deflection elements 55 negative with respect to the potential of the conductive coating on electrode 56 the beam 50*a* is caused to be deflected toward and impinge on the fluorescent coating 65. A complete picture raster may be achieved by proper synchronization between potentials applied to the horizontal deflection plates 48 which manifestly effect the sweeping action of the beam 50*a*, the electron mirror, and the vertical deflection elements 55. Obviously, the vertical level of beam impingement upon the fluorescent coating is effected by the negative electrostatic field established by vertical deflection elements 55.

The red and blue rasters are achieved in a manner similar to that described in detail with reference to the green raster. It will be obvious to those persons skilled in the television field that in order to obtain a color reproduction of the transmitted image, the individual fluorescent materials or targets which emit different colored light are scanned separately and with great rapidity by the electron beam. Due to the rapidity of the scanning operation coupled with the phenomenon referred to as "persistence of vision" of the human eye, it is possible for the viewer to observe these individual red, blue, and green rasters as a resultant color picture wherein separate colors are fused together to form the various shades and color tones of the transmitted image.

Red, blue, and green light emitting fluorescent materials have been mentioned in the description; however, it is to be pointed out that these form or constitute only one group of a larger group which may be employed in color television reception. The colors, red, blue, and green are referred to as the additive primary colors.

What is claimed is:

1. An electron discharge device comprising a plurality of electron sensitive targets, means for delivering at least one beam of electrons along a path which lies in adjacent spaced relation with the surface of one of said plurality of targets, an electron beam bending means formed in the shape of a curve which lies in adjacent and coextensive relation with one edge of said targets, means for applying signals to said beam bending means to selectively bend the beam from said first path to different ones of a plurality of second paths which lie in adjacent spaced relation with the different surfaces of said plurality of targets, said beam bending means being of a configuration to effect travel of the beam along second paths which are substantially parallel with each other, and means for applying beam deflecting forces to said beam at different intervals of said second paths to bend same into registration with correspondingly different intervals of the adjacent target.

2. An electron discharge device comprising a target, means for directing a beam along a first path which lies in adjacent spaced relation with one surface of said target, a curved electron mirror having a non-linear longitudinal axis for bending said beam from said first path to a second path in a plane substantially parallel with and in facing relation with the second surface of said target, means for sweeping said beam to cause some to travel in the direction of successively different points on said mirror, said mirror being of a configuration to effect deflection of the beam at each of said points along its length to correspondingly different parallel paths, and deflection means operable to apply deflection forces to said beam successively at different intervals thereof in said plane to direct same into registration with correspondingly different intervals of said target.

3. An electron discharge device comprising a target, means for directing a beam along a first path which lies in adjacent spaced relation with one surface of said target, electron lens means for bending said beam from said first path into a plane substantially parallel with and in facing relation with the second surface of said target, said electron lens being formed in the shape of an arc wherein the chord of the arc lies in a plane substantially parallel to the plane of said target, means for sweeping said beam within said first mentioned plane to direct same in the direction of successively different points along said lens means, the lens means being of a configuration at said different points to effect deflection of the beam to correspondingly different, substantially parallel paths in said plane, and deflection means operable to deflect said beam successively at different intervals thereof to direct same from said plane and into registration with correspondingly different intervals of the target.

4. An electron space discharge device comprising at least one electron sensitive image screen, a curved beam bending electron lens extending coextensively with one edge of said screen, an electron beam source means for selectively directing a beam in the direction of different points on said lens, a beam deflection set disposed between the viewer and said screen, and means for applying beam deflecting forces to said lens to effect the deflection of the beam thereby into the space between said beam deflection set and said screen, said lens being of a configuration at said different points to effect deflection of the beam to correspondingly different parallel paths adjacent said screen.

5. An electron space discharge device comprising target means, means for directing a beam along a first path which lies in adjacent spaced relation with one surface of said target means, a curved electron lens disposed along said first path to deflect said beam from said first path to at least a second path which lies in adjacent spaced relation with another surface of said target means, said lens being of a configuration at different points along its length to effect deflection of the beam from the different points to correspondingly different parallel paths, and deflection means for applying deflecting forces to said beam at different intervals along its second path to deflect same into correspondingly different portions of said target means.

6. An electron discharge device comprising a plurality of electron sensitive targets, means for selectively delivering a beam of electrons along different ones of a set of first paths which lie in adjacent spaced relation with the surface of one of said plurality of targets, an electron beam bending means formed in the shape of a parabola disposed along said first paths to selectively bend the beam from said first paths to further paths, which paths lie in adjacent spaced relation with other surfaces of said plurality of targets, and means for applying beam deflecting forces to said beam at different intervals along said second paths to bend same into registration with correspondingly different intervals on the adjacent target.

7. An electron discharge device comprising a target, means for directing a beam along a first path which lies in adjacent spaced relation with one surface of said target, an electron mirror having an arcuate longitudinal axis for bending said beam from said first path to a second path which lies substantially parallel and adjacent the second surface of said target, means for sweeping said beam to strike said mirror at different points for deflection thereby to correspondingly different, substantially parallel paths adjacent said target, and deflection means operable to deflect said beam successively at different intervals thereof to direct same from said second paths and into registration with correspondingly different intervals of said target.

8. An electron discharge device comprising a target, means for directing a beam of electrons along a series of different paths which lie in adjacent spaced relation with one surface of said target and in non-parallel relation with each other, an electron lens means having a parabolic longitudinal axis for deflecting said beam from said paths to corresponding paths which lie in adjacent spaced relation with the second surface of said target and in substantially parallel relation with each other, and deflection means operable to apply deflection forces to said beam at different intervals along its second path to bend same in the direction of and into registration with correspondingly different points on the second surface of said target.

9. An electron discharge device comprising a target, means for directing a beam along a first path which lies in adjacent spaced relation with one surface of said target, electron lens means for bending said beam from said first path to a second path in a plane substantially parallel with and in facing relation with the second surface of said target, said electron lens being formed in a parabolic shape wherein the longitudinal axis of the parabola lies in a plane substantially parallel to the plane of said target, means for sweeping said beam within said first mentioned plane to cause said beam to travel in the direction of correspondingly different points on said lens for deflection thereby into said plane along correspondingly different, substantially parallel paths, and deflection means operable to deflect said beam successively at different intervals along its second path to direct same from said plane and into registration with correspondingly different intervals of the target.

10. An electron space discharge device comprising an electron sensitive target, a beam bending electron lens having a non-linear longitudinal axis disposed adjacent said target, an electron beam source for selectively directing a beam along different ones of a plurality of non-parallel paths in the direction of correspondingly different points on said lens, said lens being of a configuration at said different points to deflect said beam to correspondingly different parallel paths adjacent a surface of said target, and deflection means disposed along said parallel paths for applying signals to said beam to effect selective deflection thereof into registration with correspondingly different points on said target.

References Cited in the file of this patent

UNITED STATES PATENTS

| | | |
|---|---|---|
| 2,449,558 | Lanier et al. | Sept. 21, 1948 |
| 2,513,742 | Pinciroli | July 4, 1950 |
| 2,563,807 | Alfven et al. | Aug. 14, 1951 |
| 2,571,991 | Snyder | Oct. 16, 1951 |
| 2,577,038 | Rose | Dec. 4, 1951 |
| 2,579,705 | Schroeder | Dec. 25, 1951 |
| 2,617,876 | Rose | Nov. 11, 1952 |
| 2,623,190 | Roth | Dec. 23, 1952 |
| 2,728,025 | Weimer | Dec. 20, 1955 |
| 2,795,729 | Gabor | June 11, 1957 |
| 2,795,731 | Aiken | June 11, 1957 |